Sept. 21, 1965
H. E. BRYS
3,206,972
FURNACE TENSIOMETER
Filed Sept. 27, 1962
3 Sheets-Sheet 1
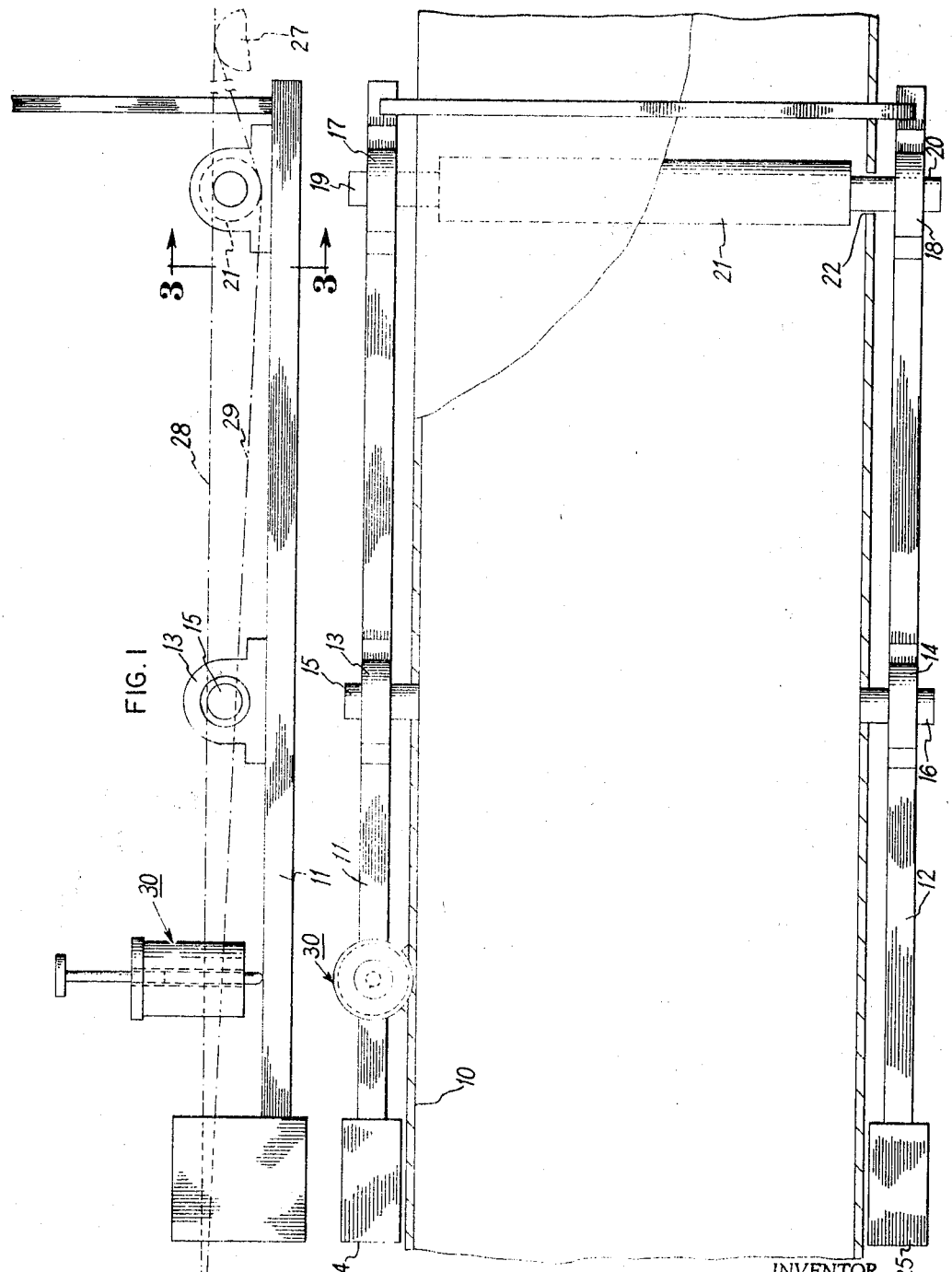
INVENTOR.
HARRY EUGENE BRYS,
BY
ATTORNEYS.

Sept. 21, 1965   H. E. BRYS   3,206,972
FURNACE TENSIOMETER
Filed Sept. 27, 1962   3 Sheets-Sheet 2

INVENTOR.
HARRY EUGENE BRYS,
BY
ATTORNEYS.

Sept. 21, 1965  H. E. BRYS  3,206,972
FURNACE TENSIOMETER

Filed Sept. 27, 1962  3 Sheets-Sheet 3

INVENTOR.
HARRY EUGENE BRYS,
BY
*Youngblut, Melville, Strasser & Foster*
ATTORNEYS.

3,206,972
FURNACE TENSIOMETER
Harry Eugene Brys, Butler, Pa., assignor to Armco Steel Corporation, Middletown, Ohio, a corporation of Ohio
Filed Sept. 27, 1962, Ser. No. 226,664
6 Claims. (Cl. 73—144)

This invention relates to a furnace tensiometer and more particularly to a tensiometer for the measurement of tension on a strip within a furnace as it is passing through the furnace.

Various tensiometer devices are known for measuring strip tension but these devices are of such nature that they cannot be installed in the interior of a furnace without suffering damage as a result of being exposed to the temperatures and atmospheres encountered within the furnace.

It is therefore an object of the present invention to provide a tensiometer apparatus having all of its parts except a tensiometer roll on the outside of the furnace such that the various parts are accessible for maintenance or repair as may be required, and whereby these parts will not be subjected to the high temperatures and various atmospheres which may prevail within the furnace.

It is another object of the invention to provide a structure as above outlined which is extremely simple but which will provide for accurate reading of strip tensions.

It is an ancillary object of the invention to provide a metering device which will be actuated by movement of the tensiometer roll inside the furnace and which will translate this movement into an electrical signal which can be read on a meter calibrated in suitable terms to indicate tension.

These and other objects of the invention which will be described in more detail hereinafter or which will be apparent to one skilled in the art upon reading these specifications, are accomplished by that construction and arrangement of parts of which the following describes an exemplary embodiment.

Reference is made to the drawings forming a part hereof and in which:

FIG. 1 is an elevational view of the tensiometer apparatus with the furnace omitted for clarity.

FIG. 2 is a plan view of FIG. 1 with the furnace shown and broken away to show the construction.

Figure 3:
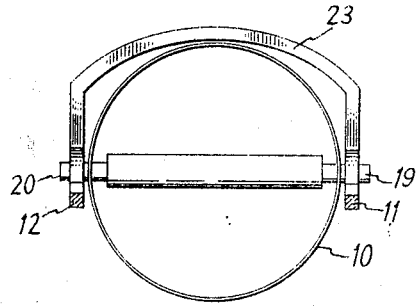
FIG. 3 is an end elevational view of the furnace showing the arrangement of the tensiometer yoke.

Briefly, in the practice of the invention, a tensiometer roll is provided within the furnace and arranged to ride on a strip passing through the furnace. It will be understood that at points ahead and behind the tensiometer roll the strip will be passing over furnace rolls so that the tensiometer roll will depress the strip below the pass line, that is, a tangent to the upper surface of the furnace rolls, by an amount dependent upon the tension being exerted on the strip. The deflection produced will be greater as the tension of the strip is less.

The tensiometer roll is provided with necks extending out through apertures in the furnace wall and is mounted in bearings or trunnions on a pair of lever arms pivotally mounted on the outside of the furnace. The lever arms are connected rigidly by a yoke extending around the outside of the furnace and the lever arms are preferably counterbalanced as required. In this way the axis of the tensiometer roll is maintained horizontally as the roll rises and drops in accordance with changes in tension of the strip. The rise and fall of the tensiometer roll produces a rotation of the lever arms, which rotation is translated to linear movement of a core rod operating in what might be termed a transformer. The core rod has a portion of magnetic permeability and a portion of non-magnetic material. The magnetic portion is of a length substantially coextensive with the axial length of the coils through which it passes. At one limit of displacement, the entire magnetic portion of the rod forms a flux linking core for the coils and, as the core rod is moved, a portion of the magnetic part of the rod is moved out of the coils while the non-magnetic portion enters the coils. Thus, with a potential applied to the primary, the secondary may be connected to an indicator which may be either a meter or a recorder or both, calibrated to indicate pounds pull and/or tension in pounds per square inch.

Referring now in more detail to the drawings, the furnace may be a tubular furnace as indicated at 10 in the figures. Suitable means for heating the strip are provided but since these do not form a part of the present invention they have not been shown. On each side of the furnace there is provided a lever arm 11 and 12. These lever arms are provided with rigid bearings 13 and 14 and are pivotable about the stub shafts 15 and 16 which may be suitably secured to the furnace wall.

Each of the levers is provided adjacent one end with a bearing 17, 18 in which the necks 19, 20 of the tensiometer roll 21 are mounted. The necks pass through apertures 22 in the furnace wall and these apertures are of a configuration to permit a rocking movement of the above described assembly over a range of several inches. In an actual embodiment, the normal maximum travel was four inches.

To maintain the tensiometer roll 21 in its horizontal attitude throughout its up and down movement, the levers 11 and 12 are rigidly connected together by a yoke 23 which extends between the levers 11 and 12 on the outside of the furnace as more clearly seen in FIG. 3. The levers 11 and 12 may be counterweighted as indicated at 24 and 25 at their other ends.

It will now be clear from FIG. 1 that the strip in passing over the furnace rolls 26 and 27 and under the tensiometer roll 21 is deflected from the straight line indicated at 28 to the line 29. As the strip tension increases, the tensiometer roll 21 will be raised, causing the levers 11 and 12 to rotate in a counterclockwise direction about the stub shafts 15 and 16. Thus, the position of any point on either of the levers 11 or 12 changes in accordance with tension on the strip.

Figure 4:
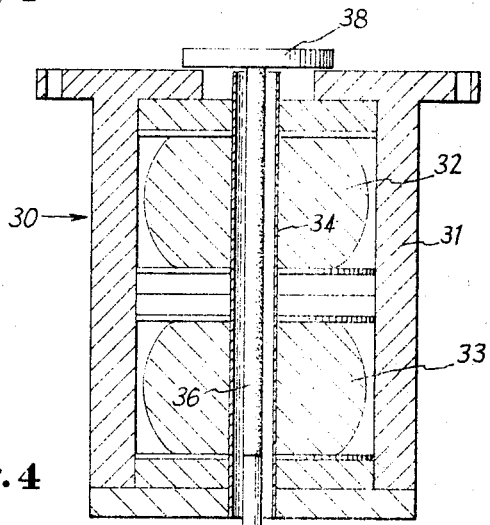
FIG. 4 is a detailed cross-sectional view of the metering device.
Figure 6:
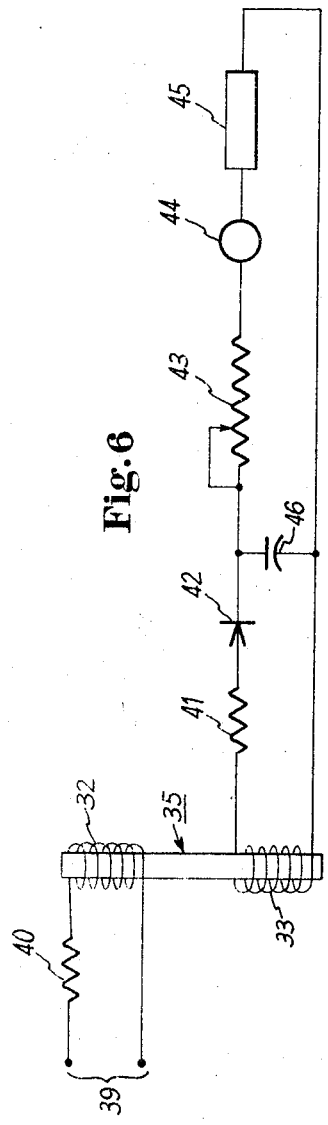
FIG. 6 is a wiring diagram.

The metering device is indicated in FIGS. 1 and 2 generally at 30 and is shown in more detail in FIG. 4. This device comprises a non-magnetic casing 31 and a primary coil 32 and a secondary coil 33 wound on a non-magnetic sleeve 34 passing axially through the casing 31. Within the sleeve 34 is a core rod indicated generally at 35 and having a portion 36 of iron or other material having magnetic permeability and a portion 37 of brass or other non-magnetic material. At its upper end, the rod 35 may be provided with a stop member 38 to prevent it from falling out of the casing 31. The lower end of the rod 35 rides on one of the levers and is shown in these drawings as riding on the lever 11. Thus, as the lever 11 rotates, the rod 35 is raised and lowered through the sleeve 34. From the wiring diagram of FIG. 6 it will be seen that the coil 32 is the primary and is connected to a suitable source of A.C. potential 39. A resistor 40 is provided in series with the primary coil 32. The secondary coil 33 is connected through a resistor 41 and rectifier 42 with the potentiometer 43, meter 44 and, if desired, recorder 45. A capacitor 46 is provided in the circuit for filtering the direct current.

It will be clear that the output of the secondary 33 will vary in accordance with how much iron or other magnetic material is within the coil 33 to provide a flux linking path and thus the meter 44 and/or recorder can indicate, if properly calibrated the tension on the strip passing through the furnace.

Figure 5:
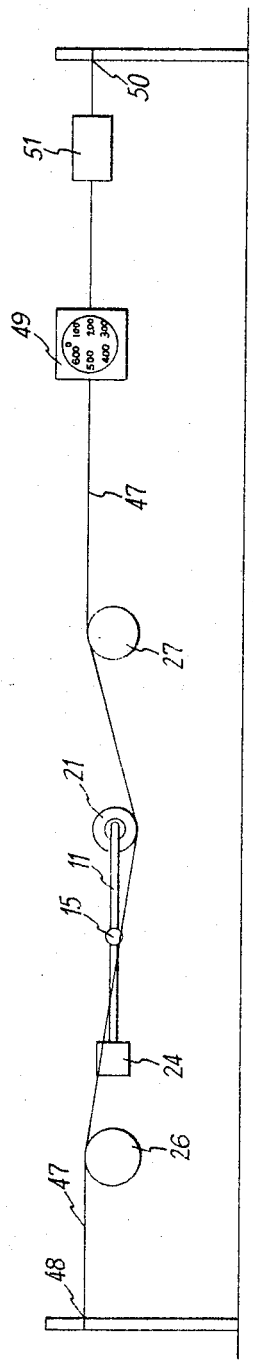
FIG. 5 is a diagrammatic representation to indicate how the apparatus is calibrated.

Calibration of the device is easily accomplished as shown diagrammatically in FIG. 5. A steel band or other suitable strip 47 is anchored at a suitable point such as 48 on the centerline of the furnace. The band 47 is passed over the furnace roll 26 under the center of the tensiometer roll 21 over the furnace roll 27 and is attached to a suitable dynamometer or other tension measuring device 49. The device 49 is connected to a suitable fixed point on the centerline of the furnace as at 50 through a chain hoist or block and tackle or the like as at 51. The dynamometer 49 will preferably have a scale suitable for the measurement of tension from zero to six hundred pounds or zero to fifteen hundred pounds, depending upon the tensions expected to be encountered. The alignment of the core rod 35 is checked to be sure that the rod can move freely through the sleeve 34 without binding at any point. With the block and tackle or hoist, tension is applied to the band 47 to raise the roll 21 evenly. The roll 21 will rise as the tension increases and, after a desired minimum tension is reached, the roll 21 may be made to rise by the addition or removal of counterweights. Preferably the reading of the scale of the dynamometer 49 is checked several times both during increase of tension and release of tension and checks should be made at 100 pounds or other desired increments. At this point, the counterweights 24 and 25 may be adjusted to obtain a correct range of readings. By means of the potentiometer 43, the meter and recorder can be calibrated to read tensions directly between desired load limits as, for example, between two hundred and five hundred pounds of tension. In this way, the readings of the meter 44 will be more accurate than if the tensiometer were required to work between zero load and maximum load.

From the foregoing description, it will be seen that there has been provided a very simple tensiometer device for reading tensions on a strip while it is passing through a furnace and that the construction is such that only the tensiometer roll is subjected to the temperatures and atmospheres of the furnace. All other operating parts are outside the furnace where they are not subject to these temperatures and atmospheres and where they are readily accessible for adjustment, maintenance and repair.

It will be understood that numerous modifications may be made without departing from the spirit of the invention and no limitation not specifically set forth in the claims is intended.

What is claimed is:

1. Apparatus for measuring the tension on a metal strip passing through a furnace, comprising a roll disposed within said furnace and adapted to ride on said strip in a position of elevation dependent upon the tension on said strip, said roll having necks and said furnace having apertures to accommodate said necks, mounting means for said necks disposed outside said furnace and means outside the furnace constraining said necks to movement as a unit with their axes parallel to the plane of travel of the strip, and means operative in response to the movement of said necks to indicate the position of elevation of said roll, and calibrated to indicate the tension on said strip.

2. Apparatus according to claim 1, wherein said last mentioned means comprises a powered primary coil and a secondary coil coaxial therewith on a vertical axis and connected to a meter, and a flux linking core rod movable axially of said coils and actuated in response to movement of said roll as determined by the tension on said strip, said core rod having a portion of magnetic permeability and of a length coextensive with the axial length of said primary and secondary coils, the lower portion of said rod being of non-magnetic material and serving as an actuator for the magnetic portion without affecting the magnetic coupling thereof.

3. Apparatus according to claim 1, wherein said roll neck mounting means are disposed on parallel levers outside the furnace, said levers being pivotally mounted and weighted and connected together by means of a yoke extending around the outside of the furnace.

4. Apparatus for measuring the tension on a strip passing through a furnace, comprising a pair of lever arms coaxially mounted outside said furnace, one on each side thereof, a rigid yoke extending from one lever arm around the outside of said furnace to the other lever arm and secured to the respective lever arms to connect them together for movement as a unit, a trunnion adjacent one end of each arm, a roll in said furnace having its neck mounted in said trunnion, said furnace having openings through which said necks pass, said openings being of a configuration to permit limited substantially vertical movement of said roll, said roll being adapted to ride on the strip passing through said furnace and to assume a position of elevation in relation to the tension on said strip, and means responsive to the movement of said lever arms to indicate the elevation of said roll, and calibrated to indicate the tension on said strip.

5. Apparatus according to claim 3, wherein said trunnions are mounted adjacent said connecting yoke and wherein the opposite ends of said lever arms are provided with counterweights, said counterweights being disposed with their center of mass below the axis of pivotal mounting of said parallel levers.

6. Apparatus according to claim 4, wherein said indicating means comprises a primary electrical coil and a secondary electrical coil disposed coaxially and having a common non-magnetic axial sleeve, a core rod passing through said sleeve and arranged to be moved axially in response to movement of said lever arms, said core rod having a portion of magnetic permeability of a length substantially coextensive with the length of said coaxial coils, and a portion of non-magnetic permeability, such that as the tension on said strip varies between a maximum and a minimum, the extent of the magnetic portion of said core rod within said coils is varied, a source of electrical energy connected to said primary coil, and a meter connected to said secondary coil.

References Cited by the Examiner

UNITED STATES PATENTS

| | | | |
|---|---|---|---|
| 1,964,241 | 6/34 | Bedell | 73—144 |
| 2,459,138 | 1/49 | Prettyman et al. | 73—15.6 |
| 2,558,573 | 6/51 | Manke | 336—136 X |
| 2,570,486 | 10/51 | Roberts | 73—144 |
| 2,624,027 | 12/52 | Clark | 73—95 |
| 2,695,519 | 11/54 | Lodge | 73—144 |
| 2,925,731 | 2/60 | Cammack | 73—144 |
| 2,942,455 | 6/60 | Smith | 73—15.6 |
| 3,108,213 | 10/63 | Golder et al. | 336—136 X |

RICHARD C. QUEISSER, *Primary Examiner.*